US009292520B1

(12) United States Patent
Madiraju Varadaraju

(10) Patent No.: US 9,292,520 B1
(45) Date of Patent: Mar. 22, 2016

(54) ADVANCED VIRTUAL SYNTHETIC FULL BACKUP SYNTHESIZED FROM PREVIOUS FULL-BACKUPS

(71) Applicant: EMC Corporation, Hopkinton, MA (US)

(72) Inventor: Kiran Kumar Madiraju Varadaraju, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 174 days.

(21) Appl. No.: 14/092,427

(22) Filed: Nov. 27, 2013

(51) Int. Cl.
*G06F 17/30* (2006.01)
(52) U.S. Cl.
CPC .................................. *G06F 17/3007* (2013.01)
(58) Field of Classification Search
CPC .................................................. G06F 17/3007
USPC .................................................. 707/645, 646
See application file for complete search history.

(56) References Cited

U.S. PATENT DOCUMENTS

| 8,099,391 | B1* | 1/2012 | Monckton ...................... 707/647 |
| 2009/0063765 | A1* | 3/2009 | Kottomtharayil et al. ..... 711/112 |
| 2010/0070725 | A1* | 3/2010 | Prahlad et al. ................. 711/162 |
| 2013/0151802 | A1* | 6/2013 | Bahadure et al. ............. 711/162 |

OTHER PUBLICATIONS

Aviraj Ajgekar, Windows Server 2012: Convert VHD to VHDX using Hyper-V Manager, May 5, 2012, blogs.technet.com, pp. 1-2.*

* cited by examiner

*Primary Examiner* — Jorge A Casanova
(74) *Attorney, Agent, or Firm* — Blakely, Sokoloff, Taylor & Zafman LLP

(57) ABSTRACT

A system and method for generating a virtual full synthetic backup of a target volume is described. For each zone associated with the target volume in which a corresponding data block has changed since the previous backup or is not represented by the previous backup, the system and method may directly copy the associated data blocks from the target volume. For each zone associated with the target volume in which a corresponding data block has not changed since the previous backup and is represented by the previous backup, the system and method may rebase the offset for the zone in the virtual full synthetic backup file to the corresponding zone in the previous backup file. Using this technique, a more efficient and robust backup may be generated.

20 Claims, 10 Drawing Sheets

ADVANCED VIRTUAL SYNTHETIC FULL BACKUP SYNTHESIZED FROM PREVIOUS FULL-BACKUPS

FIELD OF THE INVENTION

Embodiments of the present invention relate generally to data storage systems. More particularly, embodiments of the invention relate to more efficient techniques for constructing backups of a target volume based on a previous full-backup of the target volume.

BACKGROUND

Data storage utilization is continually increasing, causing the proliferation of storage systems in data centers. To protect information from being corrupted, backup operations are performed periodically. These backup operations may rely on previous backup files through the generation of an incremental backup file or may be completely independent through the generation of a completely new full backup file without reference to previous backup files.

Under an incremental backup approach, an incremental backup file is generated which includes a linkage to a parent file (i.e., the last incremental or full backup) and a set of delta values representing the changes between the last backup and the current state of the target volume. Although this incremental technique may achieve quick backup file generation, each incremental file is intrinsically linked to a parent file. This linkage creates a number of inefficiencies, including the need to clone or copy the parent file along with the incremental file during cloning operations. Further, deleting incremental files is not possible as this deletion may break the chain of subsequent incremental backups. Additionally, although incremental backup files may provide a quick approach to backing-up a target volume, periodically a full backup may be necessary.

Under a full backup approach, a single backup file is generated that represents the contents of the full target volume. Since the full backup represents the contents of the entirety of the target volume, the time needed to copy data to the full backup file may be exceeding long.

SUMMARY

A system and method for generating a virtual full synthetic backup of a target volume is described. In one embodiment, the system and method may utilize a previous full backup of the target volume along with the list of changed blocks in the target volume since the last backup to generate the virtual full synthetic backup file. For example, for each zone associated with the target volume in which a corresponding data block has changed since the previous backup or is not represented by the previous backup, the system and method may directly copy the associated data blocks from the target volume. Conversely, for each zone associated with the target volume in which a corresponding data block has not changed since the previous backup and is represented by the previous backup, the system and method may rebase the offset for the zone in the virtual full synthetic backup file to the corresponding zone in the previous backup file.

The method may be run on a client device where the backup operations are started. However, the synthetic full backup process may be started on the storage node or the backup server and not on the backup client device, because of target proximity and to prevent the use of client device resources, such as CPU/Memory and storage.

By using a combination of direct copies from the target volume and rebasing operations with a previous full backup to generate a virtual full synthetic backup, the virtual full synthetic backup generated using the method 400 provides several advantages over a traditional backup. The advantages may include 1) the elimination of the need for a traditional full backup to be generated, 2) the elimination of a linkage to another previous backup (i.e., each backups made using the virtual synthetic backup system and method is a full backup of the target volume), 3) the elimination of the need to clone a parent backup when cloning the virtual synthetic backup, 4) allowance of the deletion of other backups without the destruction/corruption of the virtual synthetic backup, and 5) greatly increased speed and efficiency of backups.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. A dataset is a collection of data that is stored in a storage space in a variety of formats.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

System Configuration

Figure 1:
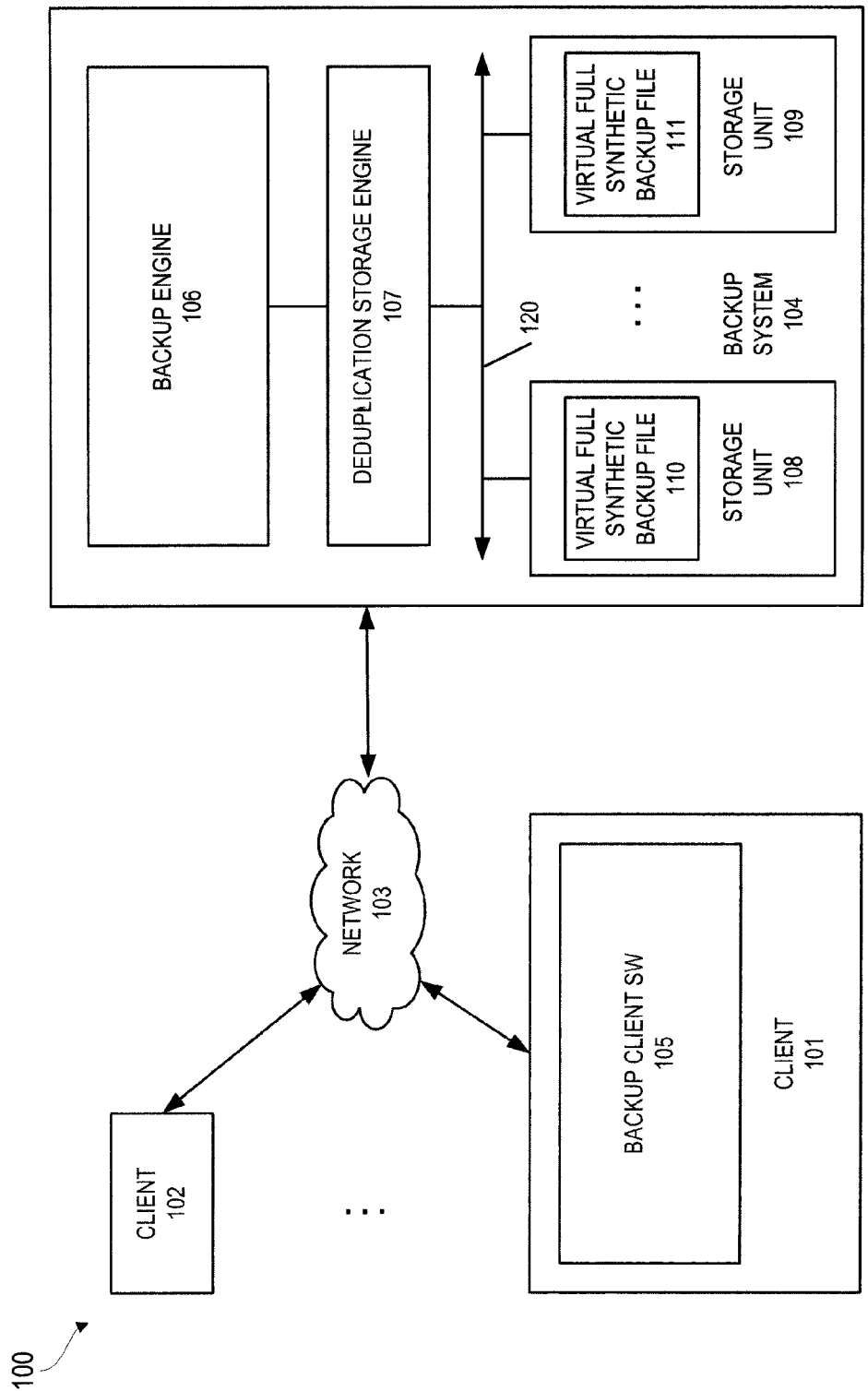
FIG. 1 shows a block diagram illustrating a storage system that includes one or more client devices and a backup system according to one embodiment of the invention.

FIG. 1 is a block diagram illustrating a storage system 100 according to one embodiment of the invention. Referring to FIG. 1, the system 100 includes, but is not limited to, one or more client devices 101 and 102 communicatively coupled to the backup system 104 over the network 103. The client devices 101 and 102 may be any type of digital devices or systems such as servers, personal computers (e.g., desktops, laptops, and tablets), "thin" clients, personal digital assistants (PDAs), Web enabled appliances, gaming devices, media players, and/or mobile phones (e.g., smartphones).

The network 103 may be any type of wired or wireless network such as a local area network (LAN), a wide area network (WAN) (e.g., the Internet), or any combination thereof. For example, the network 103 may utilize any combination of network protocols and standards, including the IEEE 802.11x suite of standards, IEEE 802.3, cellular Global System for Mobile Communications (GSM), cellular Code Division Multiple Access (CDMA), Long Term Evolution (LTE), Fibre channel protocol, and/or any other similar protocol or standard.

The backup system 104 may represent any type of server or cluster of servers for backing-up data (e.g., backing-up volumes of data). For example, the backup system 104 may be a storage server used for any of various different purposes, such as to provide users with access to shared data and/or to backup data such as mission critical data. In one embodiment, the backup system 104 includes, but is not limited to, the backup engine 106, the deduplication storage engine 107, and one or more storage units 108 and 109 communicatively coupled to each other. The storage units 108 and 109 may be implemented locally (e.g., a single node operating environment) or remotely (e.g., a multi-node operating environment) via the interconnect 120, which may be a bus and/or a network. The backup engine 106 is configured to back up data of the client devices 101 and 102 and to store the backup files in storage units 108 and 109.

In response to, for example, a data file received from the backup engine 106 to be stored in the storage units 108 and 109, according to one embodiment, the deduplication storage engine 107 is configured to segment the data file into multiple chunks (also referred to as segments) according to a variety of segmentation policies or rules. The deduplication storage engine 107 may choose not to store a chunk in one of the storage units 108 and 109 if the chunk has been previously stored in the storage units 108 and 109. In the event that the deduplication storage engine 107 chooses not to store the chunk in the storage units 108 and 109, the deduplication storage engine 107 stores metadata associated with the chunk to enable the reconstruction of a file using the previously stored chunk. As a result, chunks of data files are stored in a deduplicated manner, either within each of the storage units 108 and 109 or across at least some of the storage units 108 and 109. The metadata may be stored in at least some of the storage units 108 and 109, such that files can be accessed independent of another storage unit 108 and 109. Metadata of each storage unit 108 and 109 includes enough information to provide access to the files the unit 108 and/or 109 contains.

In other embodiments, the backup engine 106 may work in conjunction with the deduplication storage engine 107 and the backup client software 105, which is located on the client device 101, to process and backup a target volume on the client device 101 as described below. The backup engine 106, the deduplication storage engine 107, and the backup client software 105 may be any combination of software and hardware components that are capable of generating and processing data streams to back up and update data. For example, the components of the storage system 100 may work in conjunction to generate virtual full synthetic backup files 110 and/or 111 that represent target volumes associated with the client device 101. Although described in relation to the client device 101, the techniques and methods described herein may be similarly utilized to generate virtual full synthetic backup files 110 and/or 111 that represent target volumes associated with the client device 102 or another device in the storage system 100.

Figure 2:
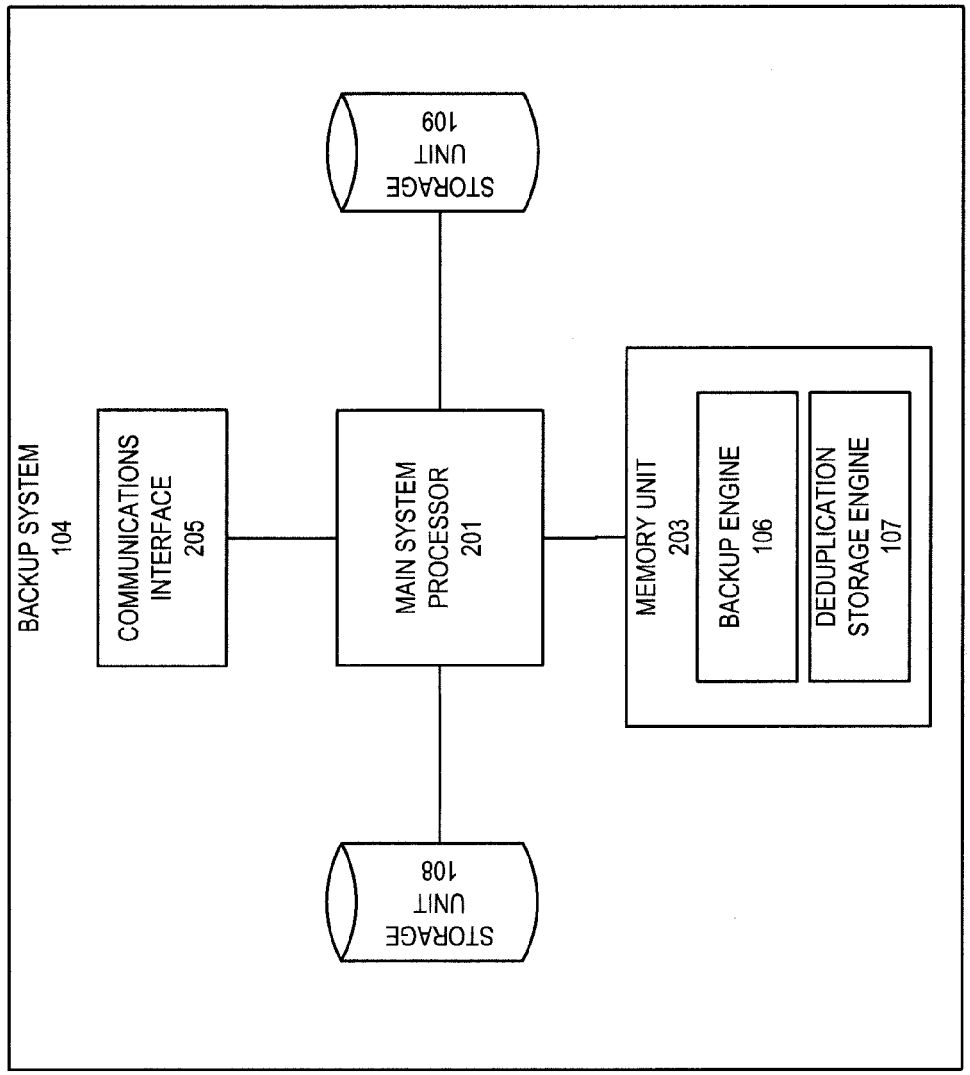
FIG. 2 shows a component diagram of the backup system according to one embodiment of the invention.

FIG. 2 shows a component diagram of the backup system 104 according to one embodiment. As shown in FIG. 2, the backup system 104 may include a main system processor 201 and a memory unit 203. The processor 201 and memory unit 203 are generically used here to refer to any suitable combination of programmable data processing components and data storage that conduct the operations needed to implement the various functions and operations of the backup system 104. The processor 201 may be a special purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines) while the memory unit 203 may refer to microelectronic, non-volatile random access memory. An operating system may be stored in the memory unit 203, along with application programs specific to the various functions of the backup system 104, which are to be run or executed by the processor 201 to perform the various functions of the backup system 104. For example, the memory unit 203 may include the backup engine 106 and the deduplication storage engine 107, which may collectively generate the virtual full synthetic backup files 110 and/or 111 based on targets volumes on the client devices 101 and 102 as will be described in further detail below.

In one embodiment, the backup system 104 may include a communications interface 205 for communicating with the client devices 101 and 102 and/or other components over the network 103 as will be described in further detail below. For example, the communications interface 205 may be capable of communicating using the IEEE 802.11x suite of standards, IEEE 802.3, cellular Global System for Mobile Communications (GSM), cellular Code Division Multiple Access (CDMA), and/or Long Term Evolution (LTE). In one embodiment, the communications interface 205 facilitates the reception of one or more pieces of data stored in a target volume on the client devices 101 and/or 102. This data may be used during a backup process as will be discussed in greater detail below.

Although shown and described as a single computing device, in other embodiments the backup system 104 may be a set of devices that collectively carry out the operations described herein. For example, the backup system 104 may be implemented by a distributed set of computing devices that communicate over a local and/or wide area network (e.g., the network 103).

Figure 3A:
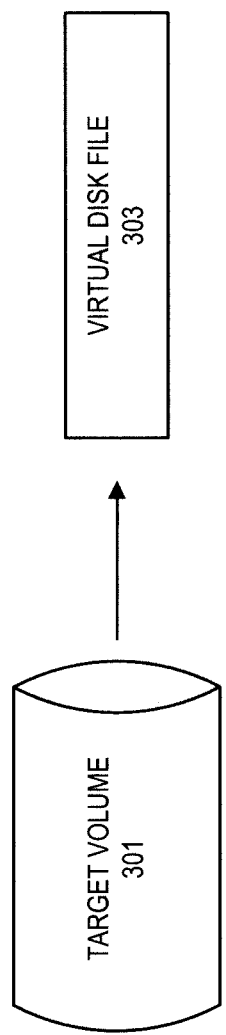
FIG. 3A shows an example virtual disk that may be used in a backup operation according to one embodiment of the invention.

FIG. 3A illustrates an example virtual disk that may be used in a backup operation, in accordance with some embodiments. In this embodiment, the target volume 301 may be configured to store information that needs to be backed-up. For example, the target volume 301 may be associated with a database or repository within one or more of the client devices 101 and 102. In some embodiments, the target volume 301 may be referred to as a parent volume. The virtual disk file 303 may be configured to store backup information related to the target volume 301. The virtual disk file 303 may be created based on a virtual disk format and may contain information typically contained in a physical volume.

For some embodiments, the virtual disk file 303 may be created based on the Hyper-V Virtual Hard Disk (VHDX) format according to the VHDX Format Specification, version 1.0, published on Aug. 25, 2012, by Microsoft Corporation of Redmond, Wash. The virtual disk file 303 may be referred to as a VHDX file and may be mounted by an operating system that supports VHDX files. One example of such an operating system is Microsoft Windows Server 2012 by Microsoft Corp.

Figure 3B:
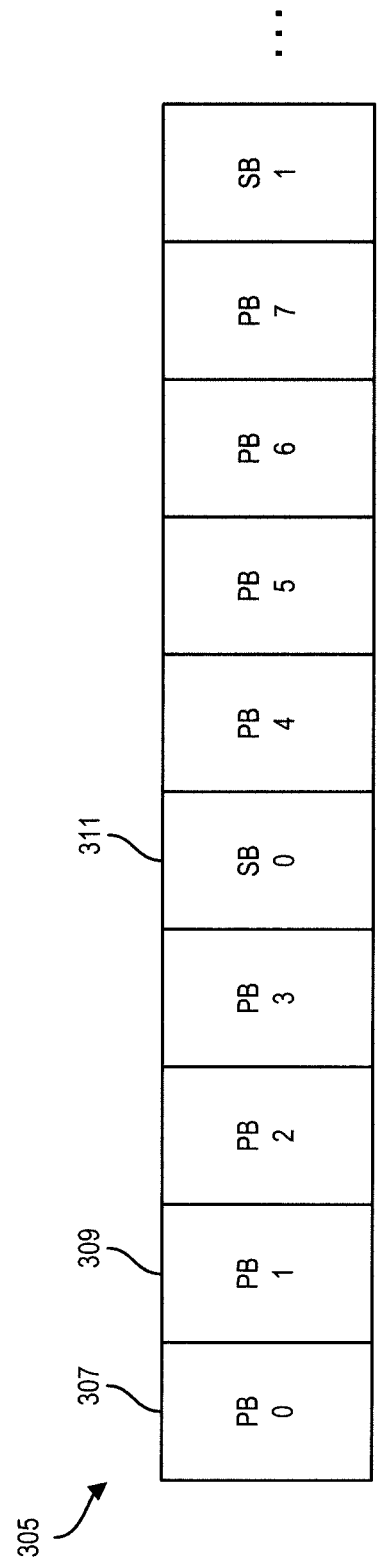
FIG. 3B shows an example block allocation table (BAT) associated with a virtual disk according to one embodiment of the invention.

FIG. 3B illustrates an example block allocation table (BAT) associated with a virtual disk, in accordance with some embodiments. For example, the BAT 305 may be associated with the virtual disk file 303. The BAT 305 may occupy a region of the virtual disk file 303 and may include a single array of multiple entries. Each entry may have a certain size (e.g., 64 bits). An entry of the BAT 305 may include information to determine the state and the file offset of a particular block within the target volume 301. As shown, the BAT 305 includes entries that point to payload blocks (PB) and sector bitmap blocks (SB). For example, payload BAT entry 307 may point to the payload 0, payload BAT entry 309 may point to the payload 1, etc. Each payload BAT entry may include information about the state of a block and the associated offset in the virtual disk file 303. The payload block 0 (PB 0) may contain the first block of bytes of the virtual disk file 303. The payload block 1 (PB 1) may contain the second block of bytes of the virtual disk file 303, etc. A payload block may be associated with a certain block size determined when the virtual disk file 303 is created. For example, each of the payload blocks associated with the payload BAT entries 307 and 309 may have a block size of at least 1 MB and at most 256 MB. The payload BAT entries and the sector bit map BAT entries may be interleaved according to a chunk size. For example, when the chunk size is four, there is one sector bit map BAT entry following four payload BAT entries, as shown in FIG. 3B.

The virtual disk file 303 may be configured to store full backup information of a parent volume (e.g., the target volume 301). For some embodiments, the backup operation that backs-up the parent/target volume to the virtual disk file 303 may be performed using a block based approach. In a block based approach, the information may be read from the parent volume block-by-block regardless of the number of files stored in the parent volume. The backup operation may take an image of the parent volume without having to refer to the file system associated with the parent/target volume. In other embodiments, the backup operation that backs-up the parent/target volume to the virtual disk file 303 may be performed using a combination of direct reads from the parent/target volume and a previous full backup of the parent/target volume as will be described in further detail below.

Figure 4:
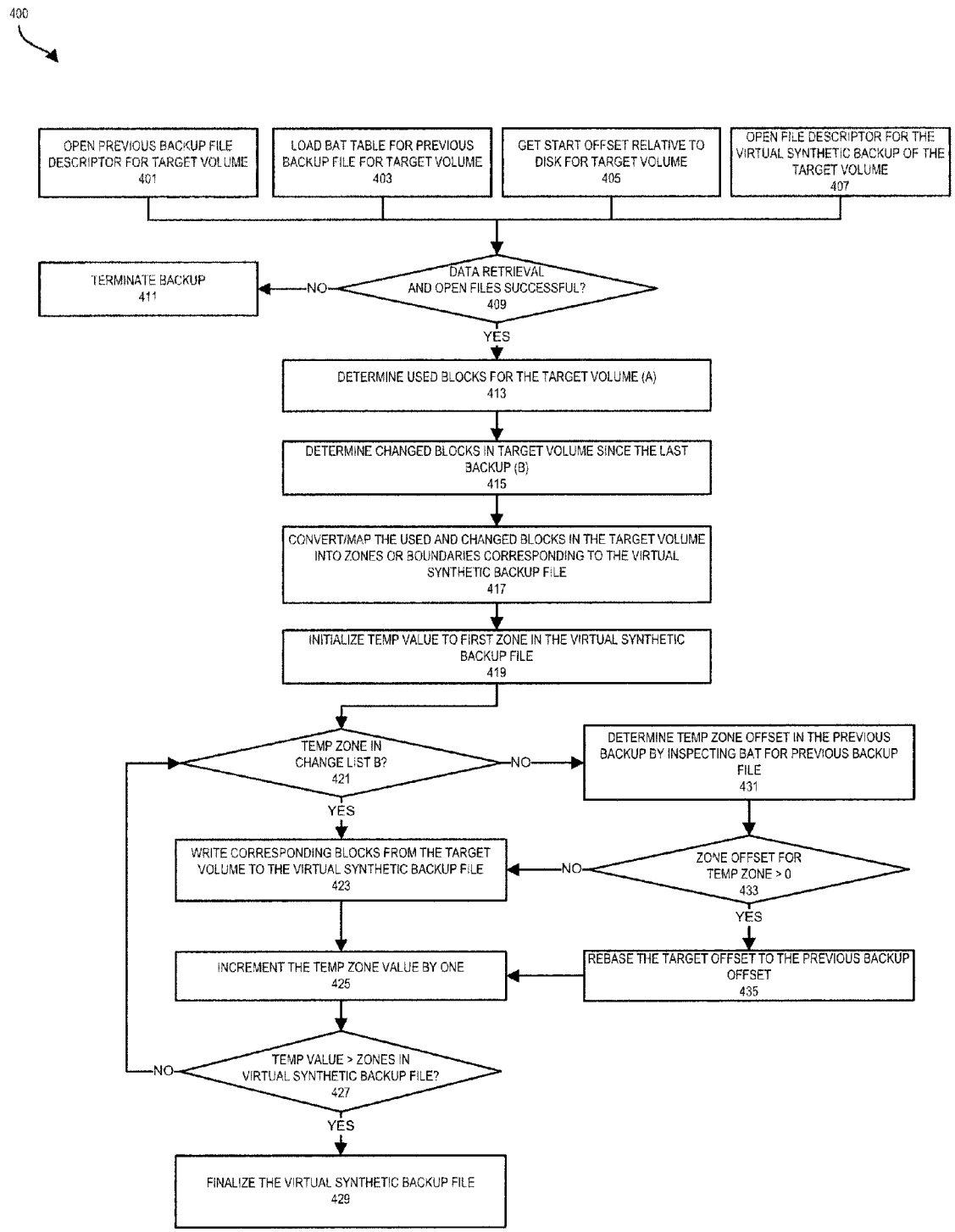
FIG. 4 shows a method for generating a virtual synthetic backup synthesized of a target volume from a previous full-backup of the target volume according to one embodiment of the invention.

Turning now to FIG. 4, a method 400 for generating a virtual synthetic backup synthesized from a previous full-backup will now be described. In one embodiment, the method 400 may be performed by one or more devices in the storage system 100. For example, the method 400 may be performed by one or more components of the backup system 104 in conjunction with the backup client software 105 on the client device 101 to generate a virtual synthetic backup for a target volume on the client device 101. The method 400 may be similarly performed for other volumes stored on the client device 101, on the client device 102, or stored on any other device. The virtual full synthetic backup file generated using the method 400 provides several advantages over a traditional backup, including 1) the elimination of the need for a traditional full backup to be generated (i.e., each backup made using the virtual synthetic backup system 100 and method 400 is a full backup of the target volume), 2) the elimination of a linkage to another previous backup, 3) the elimination of the need to clone a parent backup when cloning the virtual synthetic backup, 4) allowance of the deletion of other back-ups without the destruction/corruption of the virtual synthetic backup, and 5) greatly increased speed and efficiency of backups. It is understood that these advantages are merely illustrative and other advantages or benefits of the virtual full synthetic backup file generated using the method 400 may be realized.

Figure 5:
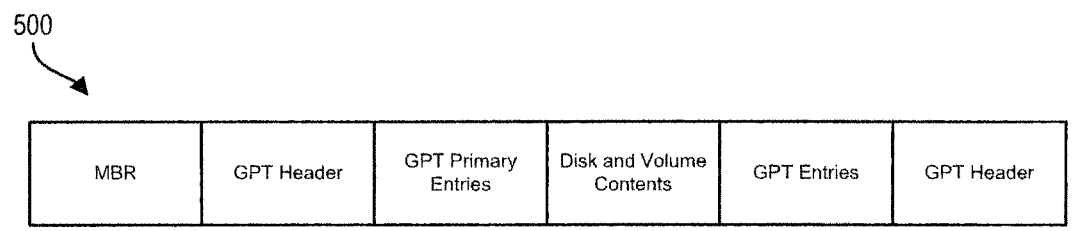
FIG. 5 shows an example file descriptor for a backup file according to one embodiment of the invention.

The method 400 may begin at operation 401 with the opening of a file descriptor for the previous backup file associated with the target volume. The file descriptor may be stored in one or more of the storage units 108 and 109 and describes the previous full backup performed for the target volume. For example, the file descriptor 500 for the previous backup file may include master boot record (MBR) information for the target volume, a globally unique identifier table (GPT) header, GPT primary entries, and disk and volume contents as shown in FIG. 5. The previous backup may have been performed at any time previous to the current backup. For example, the previous backup may have been performed the week before the current backup, the day before the current backup, the hour before the current backup, etc.

At operation 403, the method 400 may load the BAT for the previous backup file. As noted above, each entry in the BAT for the previous backup entry may include information to determine the state and the file offset of a particular block within the target volume. In one embodiment, the BAT retrieved at operation 403 may occupy a region of the previous backup file (i.e., the BAT may be within the file descriptor).

At operation 405, the method 400 may retrieve the start volume offset for the target volume relative to the disk upon which the target volume is stored. The offset indicates the starting position or starting block on the disk for the target volume to be backed-up.

At operation 407, a file descriptor for the virtual full synthetic backup, which corresponds to the current backup performed by the method 400, is opened/created. In one embodiment, the file descriptor for the virtual full synthetic backup may be generated and/or temporarily stored in the memory unit 203, the storage unit 108, and/or the storage unit 109 while the method 400 is being performed. In one embodiment, the file descriptor for the virtual full synthetic backup may be similar or identical to the file descriptor 500 shown in FIG. 5 in relation to a previous backup of the target volume. In one embodiment, the virtual full synthetic backup created using the method 400 may be a VHDX file.

As shown in FIG. 4, each of the operations 401, 403, 405, and 407 may be performed concurrently. However, in other embodiments these operations 401, 403, 405, and 407 may be performed in any order relative to each other. For example, the operations 401, 403, 405, and 407 may be performed sequentially such that operation 401 is performed first, operation 403 is performed second, operation 405 is performed third, and operation 407 is performed fourth.

At operation 409, the method 400 determines whether each of the operations 401, 403, 405, and 407 were successful (i.e., were file descriptors successfully opened and data retrieved). If each of the operations were successfully performed, the method may move to operation 413. When one or more of the operations 401, 403, 405, and 407 are unsuccessful (e.g., failure to open a file descriptor or retrieve a piece of data), the method 400 terminates by moving to operation 411. Termination of the method 400 at operation 411 may include transmitting a backup failure message to a user, network administrator, or another entity along with the reason/cause for the failure.

As noted above, upon successful performance of operations 401, 403, 405, and 407, the method 400 moves to operation 413. At operation 413, the method 400 determines the used blocks A in the target volume. The used blocks A in the target volume are blocks of memory that are being actively used to store segments of data. For example, one or more blocks in the target volume may be used by the client device 101 to store a file (e.g., a word processing file, a spreadsheet file, a multimedia file, etc.). In contrast, unused blocks may be available for storing data, but are currently not being utilized to store data (i.e., unassigned data blocks). In one embodiment, the determination of the used blocks A on the target volume at operation 413 may be determined by accessing a BAT associated with the target volume to be backed-up.

Figure 6:
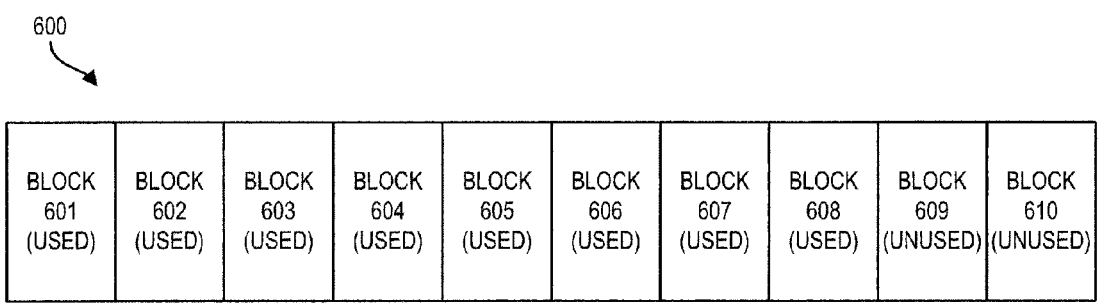
FIG. 6 shows an example target volume that may be backed-up according to one embodiment of the invention.

FIG. 6 shows an example target volume 600 that is to be backed-up using the method 400. The example target volume 600 is composed of ten blocks 601-610. As shown, blocks 601-608 are in use while blocks 609 and 610 are not in use. Accordingly, using this example target volume 600, operation 413 will determine that blocks 601-608 are being used.

After determining the used blocks A in the target volume at operation 413, the method 400 may move to operation 415 to determine the changed blocks B for the target volume since the last backup. In one embodiment, these changed blocks B may be organized in a listing of changed blocks or a change log associated with the target volume. For example, in one embodiment, a write tracker driver may monitor the target volume during normal operation of the target volume since the last backup. The write tracker driver may be software operating on the client devices 101 and 102 (e.g., the backup client software 105), firmware associated with a storage device where the target volume is located, or any other similar mechanism that may track the usage of blocks on the target volume. In this embodiment, the write tracker monitors the target volume and updates a listing of changed blocks as changes are detected.

Figure 7:
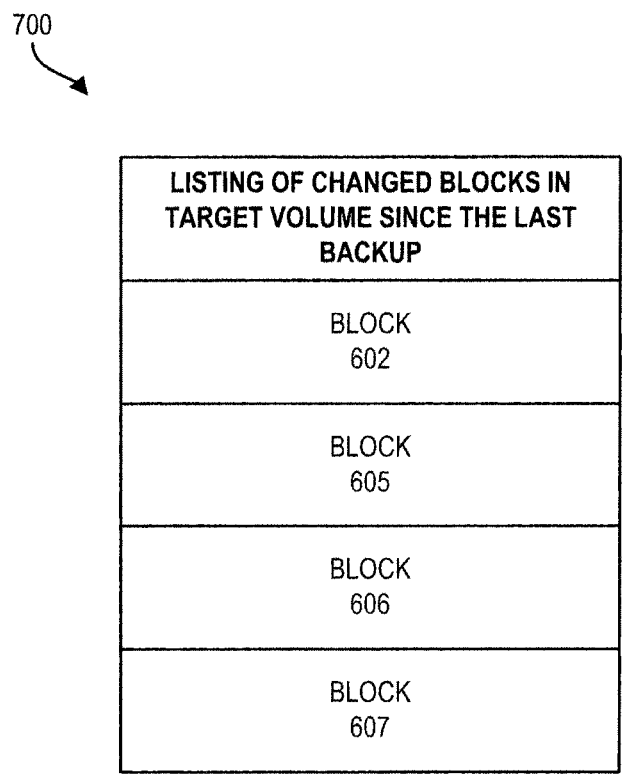
FIG. 7 shows an example listing of changed blocks for a target volume relative to the last backup of the target volume according to one embodiment of the invention.

FIG. 7 shows an example listing of changed blocks B from the last backup. As shown, blocks 602, 605, 606, and 607, corresponding to the blocks 601-610 in FIG. 6, have been updated since the last backup. Although shown as an ordered list of changed blocks, as noted above, operation 415 may determine change blocks using any mechanism or technique, including reference to a non-sequential change log for the target volume.

Although described as occurring after operation 413, in other embodiments operation 415 may occur prior to operation 413. In still other embodiments, operation 415 may be performed concurrently with operation 413. Accordingly, the order of operations 413 and 415 may be adjusted to fit the needs of the operating environment and/or other factors.

Figure 8:
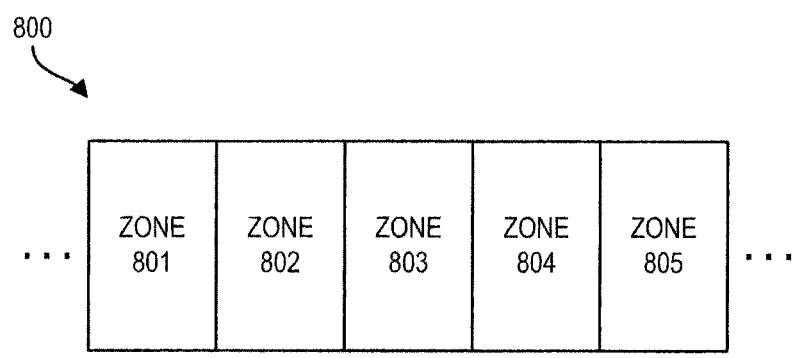
FIG. 8 shows a virtual full synthetic backup file with multiple zones associated with blocks of a target volume according to one embodiment of the invention.

Following the determination of used blocks A in the target volume and changed blocks B since the last backup, operation 417 converts/maps the used blocks A in the target volume and the changed blocks B into zones or boundaries corresponding to the new virtual synthetic backup file that is being generated through the performance of the method 400. Each zone corresponds to a portion in memory that stores data representing the contents in associated blocks. As shown in FIG. 8, the virtual full synthetic backup file 800 may be split up into multiple zones 801-805 corresponding to one or more blocks 601-610 of the target volume. For example, each zone 801-805 in the virtual synthetic backup file 800 may correspond to a two megabyte set of blocks 601-610 in the target volume. When the target volume is one gigabyte, the virtual synthetic backup file would include five hundred and twelve (512) zones. Using the example blocks 601-610 and the example zones 801-805, each zone 801-805 may correspond to two blocks 601-610. Although not shown, the virtual synthetic backup file 800 may include additional data, including the data shown and described in relation to FIG. 5.

Following operation 417, the method 400 initializes a temp zone variable and sets the temp zone variable to the first zone in the virtual full synthetic backup file at operation 419. The temp zone variable will be used to loop through each of the zones in the virtual full synthetic backup file such that data blocks corresponding to these zones may be backed-up using either direct reads and writes from the actual target volume or rebasing operations from corresponding zones in the previous backup file opened at operation 401.

At operation 421, the temp zone variable is compared against the zones in the list of changed blocks B, which had been converted/mapped to zones at operation 417, to determine whether the temp zone has changed since the last backup. If the temp zone is within the list of changed blocks B (i.e., the temp zone has been changed since the last backup of the target volume) the method 400 moves to operation 423.

At operation 423, the data blocks corresponding to the temp zone are read directly from the target volume and written to the virtual full synthetic backup file. Since the temp zone has changed since the last backup, retrieving the corresponding data blocks directly from the target volume ensures that the data in the virtual full synthetic backup file is up-to-date and accurate.

Returning to operation 421, upon comparing the temp zone variable against the zones in the list of changed blocks B, if it is determined that the temp zone is not in the list of changed blocks B, the method 400 moves to operation 431. At operation 431, the method 400 determines an offset for the temp zone in the previous backup file. In one embodiment, operation 431 may determine the offset for the temp zone in the previous backup file by examining the BAT for the previous backup file. By determining the offset for the temp zone in the previous backup file, the method 400 may determine whether a copy of the zone is already located in the previous backup file. Since the temp zone has already been determined to not have been changed since the last backup (i.e., failure to be in the list of changed blocks B), the corresponding zone in the previous backup file may be utilized for the virtual synthetic backup file generated using the method 400 without direct access to the target volume. The process of importing these unchanged blocks in the virtual full synthetic backup file is described in further detail below.

At operation 433, the method 400 determines whether the zone offset from operation 431 is greater than zero. By determining whether the zone offset for the temp zone in the previous backup file is greater than zero, operation 433 verifies whether the temp zone was represented/stored in the previous backup file. In other embodiments, other techniques may be used to determine the presence of the temp zone in the previous backup file, including detection of an error code or catching an exception.

Upon determining that the zone offset from operation 431 is less than zero or otherwise determining that the temp zone is not represented/stored in the previous backup file, the method 400 moves from operation 433 to operation 423. As noted above, at operation 423 the data blocks corresponding to the temp zone are read directly from the target volume and written to the virtual full synthetic backup file. Since the temp zone is not represented/stored in the last backup file, retrieving the corresponding data blocks directly from the target volume ensures that the data in the virtual full synthetic backup file is up-to-date and accurate.

Figure 9A:
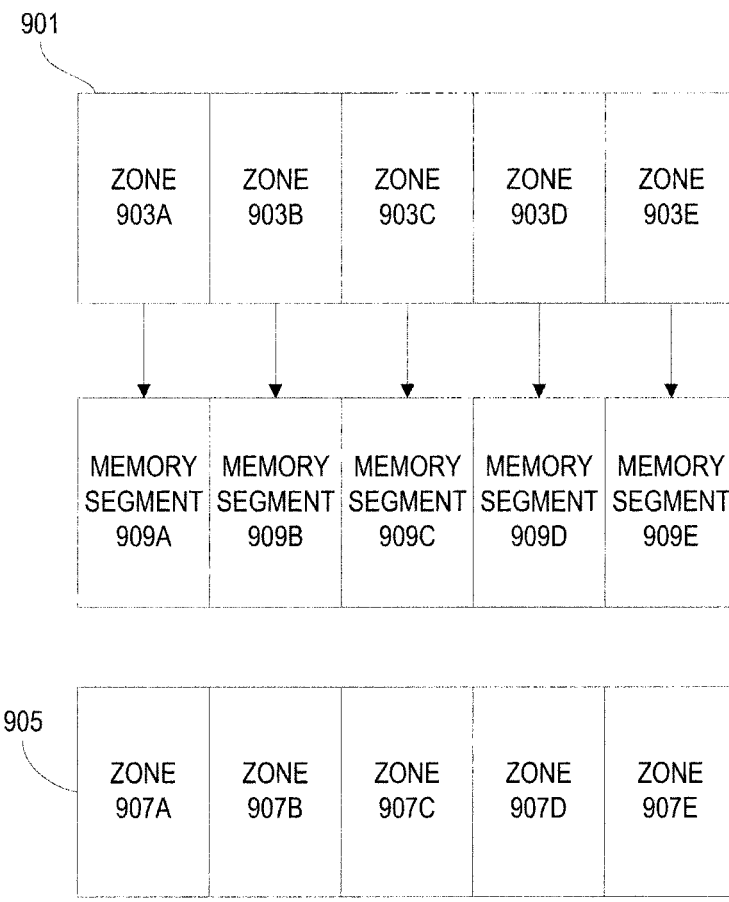
FIG. 9A shows the relationship between zones in a backup file and memory segments according to one embodiment of the invention.
Figure 9B:
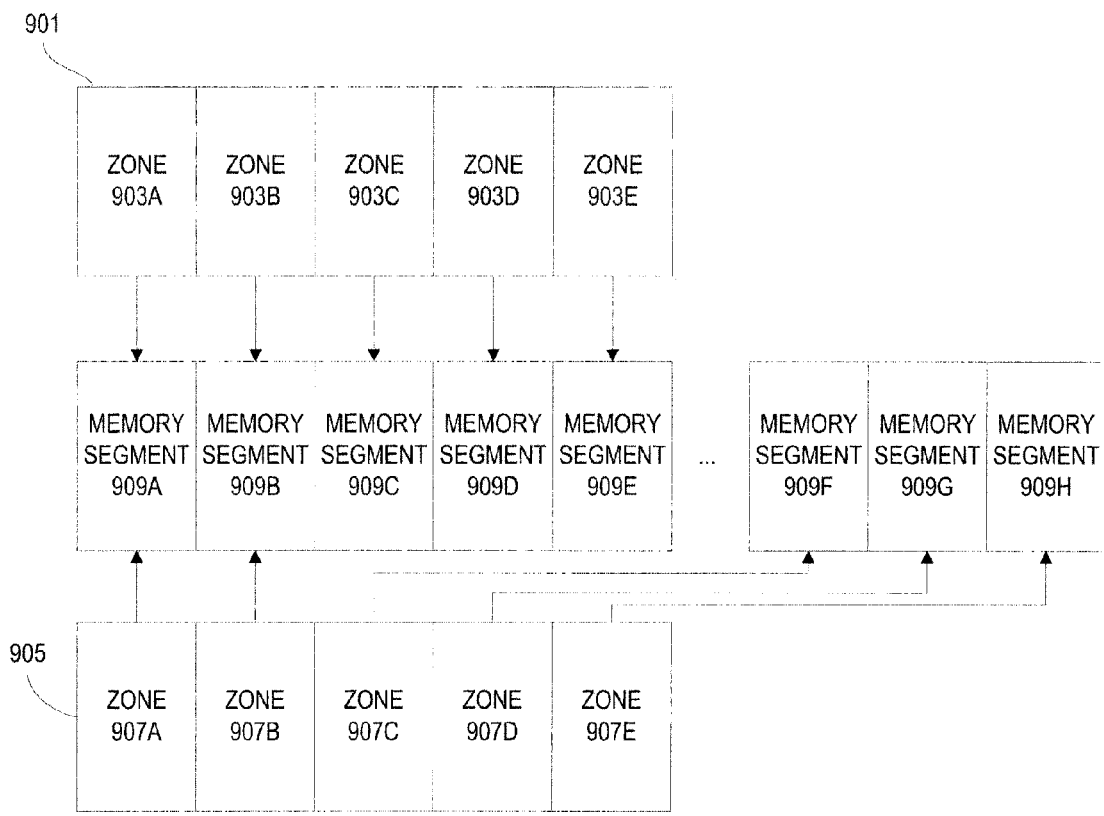
FIG. 9B shows the relationship between zones in a virtual full synthetic backup file and memory segments after a rebasing operation according to one embodiment of the invention.

Conversely, upon determining at operation 433 that the zone offset from operation 431 is greater than zero or otherwise determining that the temp zone is represented/stored in the previous backup file, the method 400 moves from operation 433 to operation 435. At operation 435, the offset for the temp zone in the virtual full synthetic backup file is rebased to the offset determined at operation 431. Rebasing is the process of pointing the offset of the temp zone in the virtual synthetic backup file to a segment of memory associated with the zone offset determined at operation 431. For example, as shown in FIG. 9A, the previous backup file 901 may include multiple zones 903A-903E while the virtual full synthetic backup file 905 may include multiple zones 907A-907E. Each of the zones 903A-903E in the previous backup file 901 may reference, point to, or otherwise be associated with a memory segment 909A-909E in a storage disk based on entries in an associated BAT. In this example, the temp zone in the virtual full synthetic backup file 905 may correspond to zone 907A and the zone offset for zone 907A determined at operation 431 may correspond to zone 903A in the previous backup file 901. Using this example situation, rebasing at operation 435 may include the association of zone 907A in the virtual full synthetic backup file 905 with the memory segment 909A (i.e., the memory block 909 associated with zone 903A in the previous backup file) as shown in FIG. 9B. This rebasing operation may be performed through the modification of an entry in a BAT associated with the virtual full synthetic backup file 905. Similarly, in a subsequent iteration of operation 435, zone 907B may be associated with memory segment 909B, since the data blocks represented by zones 907B and 909B have not changed since the previous full backup. In contrast, zones 907C-907E are associated with memory segments 909F-909H at operation 423 instead of memory segments 909C-909E (corresponding with their counterpart zones 903C-903E) since data blocks in the target volume for these zones 907C-907E have changed since the previous full backup.

By rebasing at operation 435, the method 400 eliminates the need to directly copy data from the target volume and/or the previous backup file to the virtual full synthetic backup file. By utilizing rebasing with zones of previous backups, the virtual full synthetic backup generated using the method 400 provides several advantages over a traditional backup, including 1) the elimination of the need for a traditional full backup to be generated, 2) the elimination of a linkage to another previous backup, 3) the elimination of the need to clone a parent backup when cloning the virtual synthetic backup, 4) allowance of the deletion of other backups without the destruction/corruption of the virtual synthetic backup, and 5) greatly increased speed and efficiency of backups.

Following operation 435 or operation 423, the method increments the temp zone value by one at operation 425 as shown in FIG. 4 (i.e., moves to the next zone in the virtual full synthetic backup file). Thereafter, the incremented value of the temp zone variable may be compared against the zones in the virtual synthetic backup file for the target volume at operation 427. The comparison at operation 427 determines whether each zone/data block of the target volume has been analyzed by the method 400 and accordingly represented in the generated virtual full synthetic backup. When operation 427 determines that more zones need to be analyzed, the method 400 returns to operation 421 and analyzes the next zone. Conversely, when operation 427 determines that there are no more zones to be analyzed, the method 400 moves to operation 429 to finalize the virtual synthetic backup file (i.e., close and store the virtual synthetic backup file).

As noted above, the method 400 uses a combination of direct copies from the target volume and rebasing operations with a previous full backup to generate a virtual full synthetic backup. By utilizing rebasing with zones of previous backups, the virtual full synthetic backup generated using the method 400 provides several advantages over a traditional backup, including 1) the elimination of the need for a traditional full backup to be generated (i.e., each backup made using the virtual synthetic backup system 100 and method 400 is a full backup of the target volume), 2) the elimination of a linkage to another previous backup, 3) the elimination of the need to clone a parent backup when cloning the virtual synthetic backup, 4) allowance of the deletion of other backups without the destruction/corruption of the virtual synthetic backup, and 5) greatly increased speed and efficiency of backups.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer implemented method for constructing a virtual full synthetic backup of a target volume based on a first backup file representing a previous full backup of the target volume, comprising:
   determining a set of used blocks for the target volume, wherein the set of used blocks are being actively used in the target volume to store segments of data;
   determining a set of changed blocks for the target volume, wherein the set of changed blocks has been changed since the previous full backup represented by the first backup file;
   examining a block allocation table (BAT) associated with the first backup file to determine zone offsets for zones in a second backup file;
   mapping the set of used blocks in the target volume to a first set of mapped zones representing the set of used blocks in the second backup file, wherein each mapped zone of the first set corresponds to a storage segment that stores data associated with contents in the associated blocks; and
   constructing the second backup file by rebasing offsets for the first set of mapped zones in the second backup file for unchanged blocks in the target volume to corresponding offsets of a second set of mapped zones in the first backup file based on the zone offsets determined from the BAT, wherein the unchanged blocks are blocks in the target volume that have not changed since the previous full backup represented by the first backup file.

2. The computer implemented method of claim 1, wherein constructing the second backup file further comprises:
   copying data blocks in the set of changed data blocks from the target volume to corresponding mapped zones in the second backup file.

3. The computer implemented method of claim 1, wherein constructing the second backup file further comprises:
   copying data blocks not represented in the first backup file to corresponding mapped zones in the second backup file.

4. The computer implemented method of claim 1, wherein rebasing offsets includes pointing a zone in the second backup file to a memory segment associated with a corresponding zone in the first backup file.

5. The computer implemented method of claim 4, wherein rebasing is performed through adjustment of entries in a block allocation table (BAT) associated with the second backup file.

6. The computer implemented method of claim 1, wherein the first backup file is a Hyper-V Virtual Hard Disk (VHDX) file.

7. The computer implemented method of claim 1, wherein the first backup file further includes a globally unique identifier table (GPT) header, master boot record (MBR) information for the target volume, GPT primary entries, and volume information for the target volume.

8. A non-transitory computer-readable storage medium having instructions stored therein, which when executed by a processor performs operations for constructing a virtual full synthetic backup of a target volume based on a first backup file representing a previous full backup of the target volume, the operations comprising:
   determining a set of used blocks for the target volume, wherein the set of used blocks are being actively used in the target volume to store segments of data;
   determining a set of changed blocks for the target volume, wherein the set of changed blocks has been changed since the previous full backup represented by the first backup file;
   examining a block allocation table (BAT) associated with the first backup file to determine zone offsets for zones in a second backup file;
   mapping the set of used blocks in the target volume to a first set of mapped zones representing the set of used blocks in the second backup file, wherein each mapped zone of the first set corresponds to a storage segment that stores data associated with the contents in the associated blocks; and
   constructing the second backup file by rebasing offsets for the first set of mapped zones in the second backup file for unchanged blocks in the target volume to corresponding offsets of a second set of mapped zones in the first backup file based on the zone offsets determined from the BAT, wherein the unchanged blocks are blocks in the target volume that have not changed since the previous full backup represented by the first backup file.

9. The non-transitory computer-readable storage medium of claim 8, wherein constructing the second backup file further comprises:
   copying data blocks in the set of changed data blocks from the target volume to corresponding mapped zones in the second backup file.

10. The non-transitory computer-readable storage medium of claim 8, wherein constructing the second backup file further comprises:
    copying data blocks not represented in the first backup file to corresponding mapped zones in the second backup file.

11. The non-transitory computer-readable storage medium of claim 8, wherein rebasing offsets includes pointing a zone in the second backup file to a memory segment associated with a corresponding zone in the first backup file.

12. The non-transitory computer-readable storage medium of claim 11, wherein rebasing is performed through adjustment of entries in a block allocation table (BAT) associated with the second backup file.

13. The non-transitory computer-readable storage medium of claim 8, wherein the first backup file is a Hyper-V Virtual Hard Disk (VHDX) file.

14. The non-transitory computer-readable storage medium of claim 8, wherein the first backup file further includes a globally unique identifier table (GPT) header, master boot record (MBR) information for the target volume, GPT primary entries, and volume information for the target volume.

15. A data storage system, comprising:
   a processor;
   a memory coupled to the processor;
   a client for updating a target volume; and
   a backup system, loaded in the memory and executed by the processor, for constructing a virtual full synthetic backup of the target volume based on a first backup file representing a previous full backup of the target volume, wherein the backup system is configured to:
      determine a set of used blocks for the target volume, wherein the set of used blocks are being actively used in the target volume to store segments of data;
      determine a set of changed blocks for the target volume, wherein the set of changed blocks has been changed since the previous full backup represented by the first backup file;
      examine a block allocation table (BAT) associated with the first backup file to determine zone offsets for zones in a second backup file;
      map the set of used blocks in the target volume to a first set of mapped zones representing the set of used blocks in the second backup file, wherein each mapped zone of the first set corresponds to a storage segment that stores data associated with contents in the associated blocks; and
      construct the second backup file by rebasing offsets for the first set of mapped zones in the second backup file for unchanged blocks in the target volume to corresponding offsets of a second set of mapped zones in the first backup file based on the zone offsets determined from the BAT, wherein the unchanged blocks are blocks in the target volume that have not changed since the previous full backup represented by the first backup file.

16. The data storage system of claim 15, wherein the backup system is further configured to:
   copy data blocks in the set of changed data blocks from the target volume to corresponding mapped zones in the second backup file.

17. The data storage system of claim 15, wherein the backup system is further configured to:
   copy data blocks not represented in the first backup file to corresponding mapped zones in the second backup file.

18. The data storage system of claim 15, wherein rebasing offsets includes pointing a zone in the second backup file to a memory segment associated with a corresponding zone in the first backup file.

19. The data storage system of claim 18, wherein rebasing is performed through adjustment of entries in a block allocation table (BAT) associated with the second backup file.

20. The data storage system of claim 15, wherein the first backup file further includes a globally unique identifier table (GPT) header, master boot record (MBR) information for the target volume, GPT primary entries, and volume information for the target volume.

* * * * *